(12) United States Patent
Brock et al.

(10) Patent No.: US 11,326,965 B2
(45) Date of Patent: May 10, 2022

(54) TRANSDUCER STRUCTURE, TRANSDUCER COMPRISING SUCH TRANSDUCER STRUCTURE, AND SENSOR COMPRISING SAID TRANSDUCER

(71) Applicant: Pietro Fiorentini S.P.A., Arcugnano (IT)

(72) Inventors: Martin Edward Brock, Cambridge (GB); Gordon Lamb, Cambridge (GB); Thomas Murray Fry, Cambridge (GB); Xenofon Kalogeropoulos, Cambridge (GB); Christopher James Rosser, Cambridge (GB)

(73) Assignee: Pietro Fiorentini S.P.A., Arcugnano (IT)

( * ) Notice: Subject to any disclaimer, the term of this patent is extended or adjusted under 35 U.S.C. 154(b) by 448 days.

(21) Appl. No.: 16/468,609

(22) PCT Filed: Dec. 21, 2017

(86) PCT No.: PCT/IB2017/058251
§ 371 (c)(1),
(2) Date: Jun. 11, 2019

(87) PCT Pub. No.: WO2018/116226
PCT Pub. Date: Jun. 28, 2018

(65) Prior Publication Data
US 2020/0011748 A1    Jan. 9, 2020

(30) Foreign Application Priority Data

Dec. 22, 2016 (IT) .......................... 102016000129935

(51) Int. Cl.
*G01L 1/18*  (2006.01)
*G01H 9/00*  (2006.01)
(Continued)

(52) U.S. Cl.
CPC ............. *G01L 1/183* (2013.01); *G01H 9/004* (2013.01); *G01H 11/08* (2013.01); *G01L 1/242* (2013.01);
(Continued)

(58) Field of Classification Search
CPC ...... G01P 15/097; G01P 15/09; G01P 15/093; G01P 15/122; G01V 1/182; G01V 1/181;
(Continued)

(56) References Cited

U.S. PATENT DOCUMENTS 4,322,829 A   3/1982  Davis, Jr. et al.
4,412,317 A * 10/1983  Asjes ..................... G01V 1/181
                                                       367/154
(Continued)

FOREIGN PATENT DOCUMENTS

WO    2016/182428 A1    11/2016
WO    2016/182431 A1    11/2016

OTHER PUBLICATIONS

International Search Report and Written Opinion dated Mar. 14, 2018, issued in PCT Application No. PCT/IB2017/058251, filed Dec. 21, 2017.

*Primary Examiner* — Helen C Kwok
(74) *Attorney, Agent, or Firm* — Workman Nydegger

(57) ABSTRACT

A transducer structure for converting a deformation along an axis into a corresponding deformation on a plane orthogonal to the axis itself, including: two end plates facing each other and aligned along a common reference axis (X); connection members projecting radially from each end plate according to respective different directions; lateral bars connecting the end plates to one another through two connection members. The connection members are deformable within respective deformation planes to allow relative movements between the end plates and the lateral bars such as to convert an axial (Continued)

movement of mutual approach between the two end plates into a corresponding radial movement of the lateral bars away from the reference axis (X), and vice-versa.

27 Claims, 4 Drawing Sheets

(51) Int. Cl.
| | |
|---|---|
| *G01H 11/08* | (2006.01) |
| *G01V 1/18* | (2006.01) |
| *G01L 1/24* | (2006.01) |
| *G01P 15/093* | (2006.01) |
| *G01P 15/12* | (2006.01) |
| *G01P 15/09* | (2006.01) |

(52) U.S. Cl.
CPC ............ *G01P 15/09* (2013.01); *G01P 15/093* (2013.01); *G01P 15/122* (2013.01); *G01V 1/181* (2013.01); *G01V 1/182* (2013.01)

(58) Field of Classification Search
CPC ......... G01L 1/242; G01L 1/183; G01H 9/004; G01H 11/08
See application file for complete search history.

(56) References Cited

U.S. PATENT DOCUMENTS

| | | |
|---|---|---|
| 4,534,222 A | 8/1985 | Finch et al. |
| 4,893,930 A | 1/1990 | Garrett et al. |
| 5,317,929 A | 6/1994 | Brown et al. |
| 5,477,101 A * | 12/1995 | Ounadjela ............... G01V 1/145 310/334 |
| 5,825,489 A | 10/1998 | Lagakos et al. |
| 5,903,349 A | 5/1999 | Vohra et al. |
| 6,563,967 B2 | 5/2003 | Tweedy et al. |
| 6,575,033 B1 | 6/2003 | Knudsen et al. |
| 6,891,621 B2 | 5/2005 | Berg et al. |
| 6,955,085 B2 | 10/2005 | Jones et al. |
| 7,463,555 B2 | 12/2008 | Bevan et al. |
| 9,097,505 B2 | 8/2015 | Andersen et al. |
| 2002/0154860 A1 | 10/2002 | Fernald et al. |
| 2004/0237648 A1 | 12/2004 | Jones et al. |
| 2008/0115374 A1* | 5/2008 | Van Kann ................ G01V 7/08 33/366.11 |
| 2011/0174075 A1 | 7/2011 | Watanabe et al. |

\* cited by examiner

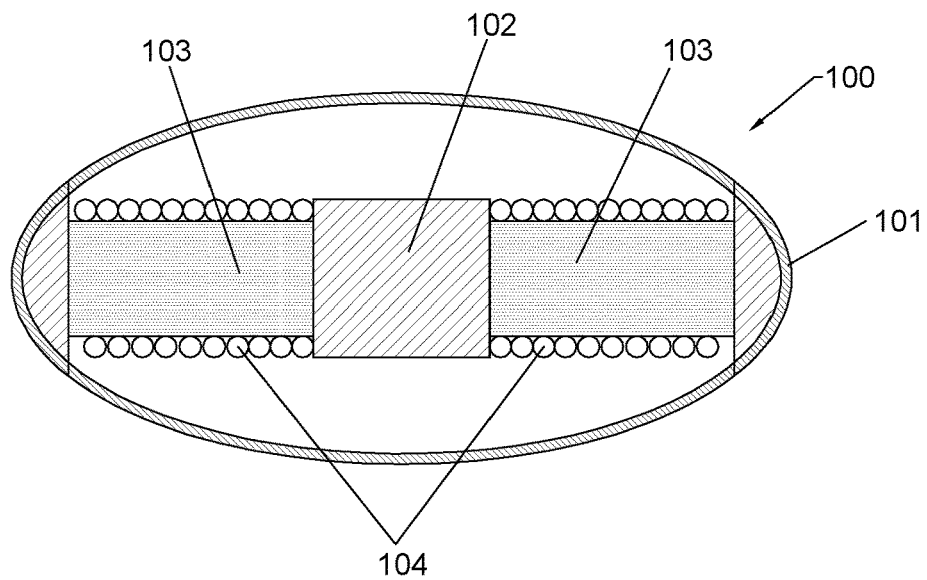
Fig.1 - PRIOR ART (arte nota)
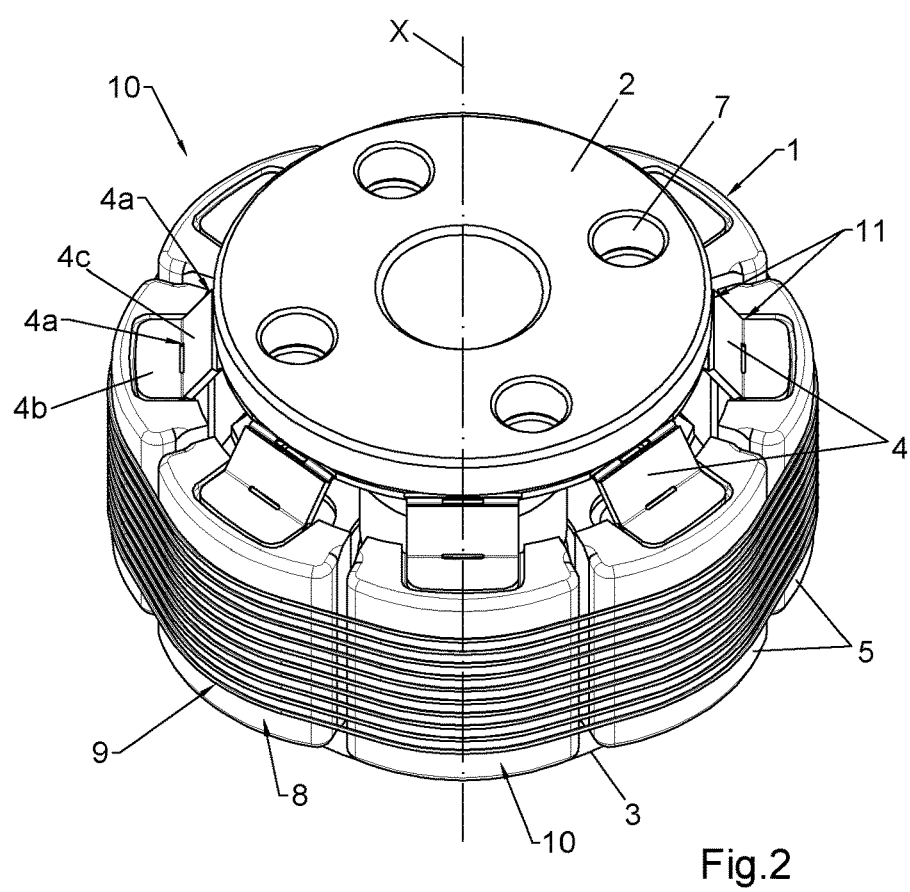
Fig.2

TRANSDUCER STRUCTURE, TRANSDUCER COMPRISING SUCH TRANSDUCER STRUCTURE, AND SENSOR COMPRISING SAID TRANSDUCER

FIELD OF INVENTION

The present invention concerns the field of the fibre-optic transducers, in particular force and displacement transducers, more particularly transducers suitable for being used in vibration sensors like, e.g., geophones.

BACKGROUND OF THE INVENTION

Sensors are known that transduce an external physical quantity, for example temperature, pressure or strain, into a measurable change in the optical properties of an optical fibre. The change in optical properties can then be measured by processing equipment located remotely from the location of the sensor.

The above mentioned sensors offer a number of benefits over conventional sensors. In particular, they can operate at high temperatures and pressures and in the presence of strong electro-magnetic disturbances. They also allow the measurement equipment—also referred to as "interrogator"—to be located at a distance of many kilometres form the measurement location. In some cases they can also offer higher intrinsic sensitivity than conventional sensors, for example when an optical interferometer is employed to measure very small length changes.

As a result, fibre-optic sensors are particularly suitable for making measurements within the bore of an oil or gas well downhole sensing. In these locations, temperatures can exceed 200° C. and pressures can exceed 1000 bar. The measurement site may be many kilometres underground and hence many kilometres from where any complex electronic equipment could be located.

One class of downhole sensors is represented by the geophones. These sensors convert ground motion, like displacement, velocity or acceleration resulting from seismic waves, into a measureable signal. Typically, an array of geophones is placed into an oil or gas well and used to record the seismic signals received from a seismic source, i.e., an explosion or other large shock at the surface. The signals received from the multiple geophones are then correlated and post-processed to produce an estimate of the sub-surface geology, and hence to determine where oil- or gas-reservoirs may be located, or to monitor how effectively these reservoirs are being depleted.

As it is known, fibre-optic geophones comprise a transducer having a proof mass suspended from a spring. In response to ground acceleration, the relative inertia of the proof mass causes the spring to experience compression or expansion. An optical fibre is attached to the spring or in some cases itself forms the spring and is subject to a varying strain depending on the expansion or compression of the spring. This varying strain is then sensed remotely, either interferometrically, or by measuring the wavelength shift of a fibre Bragg grating embedded in the fibre.

The seismic signals in question are typically very small, since ground accelerations are typically between one millionth and one billionth of the Earth's gravity. A highly sensitive fibre-optic transducer is therefore typically needed and interferometric methods are therefore typically used to measure the changes in fibre length resulting from the varying strain on the fibre.

Achieving high sensitivity also generally requires a long length of fibre to be strained. Since this total measureable optical signal is proportional to the total change in length of the fibre, a longer length of fibre will result in a larger overall length change for a given external strain, and hence a larger optical signal. However, the downhole environment is very space constrained. A downhole geophone has a typical maximum diameter of around 5 cm and a length of a few dozen centimetres. As a result, in order to stretch a long length of fibre, the fibre must be coiled multiple times and a mechanism must be used to convert the motion of the aforementioned spring into a strain along the total coiled length of fibre.

The prior art discloses a number of different arrangements for such a fibre optic transducer.

In a first arrangement, disclosed, e.g., in documents U.S. Pat. Nos. 4,322,829, 6,575,033 and 9,097,505, the proof mass is suspended from an optical fibre, possibly wounded in loops, acting as a spring. The sensing fibre is arranged parallel to the axis in which motion is being sensed. If multiple loops are used, the loops are wound around an axis which is perpendicular to the axis in which motion is being sensed.

As a result, the above mentioned arrangement requires an elongated space envelope to accommodate the linear space for the suspension fibres at either side of the proof mass. In a downhole application it is typically desirable to measure seismic vibrations occurring in all three Cartesian axes independently. However, the space constraints of the downhole environment limit the shape of a geophone to be a long slender cylinder. As a result the suspension mechanism of the transducer can only readily be used for the axis aligned with the cylinder's axis, and not for the transverse axes. This limits the usefulness of geophone sensors based on transducers according to the above arrangement.

A known work-around for the above mentioned limitation, disclosed, e.g., in document U.S. Pat. No. 6,891,621, is to use a hinge mechanism to convert motion in a transverse axis into motion along the longitudinal axis. However, this mechanism relies on a mechanical bearing and is therefore subject to static and kinetic friction and to wear, that limit its sensitivity and reliability. Furthermore the effectiveness of the mechanism depends heavily on the geophone remaining substantially vertical, which is often not the case in many oil or gas well bores which may be inclined or even fully horizontal.

A further arrangement which is better suited to the space constrains of a downhole environment regardless of well bore orientation is disclosed, e.g., in documents U.S. Pat. Nos. 4,893,930, 5,825,489 and 7,463,555. According to this arrangement, schematically shown in FIG. 1, a fibre optic transducer 100 comprises a casing 101 in which a proof mass 102 is suspended by means of two cylinders 103 of a rubbery material, each of which is referred to in the technical jargon as a "mandrel", that are arranged on respective opposite sides of the proof mass 102. A given number of coils of optical fibre 104 is wound around each cylinder 103. According to a known variant, disclosed in document U.S. Pat. No. 4,534,222, the coils of fibre are embedded in a block of rubber material. Because of the relatively incompressible nature of rubber, a reduction in axial length of such a rubber mandrel results in a corresponding increase in its diameter so that the total volume remains constant. The above indicated increase in diameter causes all the coils of optical fibre to be strained.

The use of a rubber mandrel as described above is attractive because of its relative robustness to external shock, because of its compactness, since no excess volume is required beyond the volume occupied by the coils of fibre, and because of the large number of coils that can be wound around the rubber mandrel, thus leading to high sensitivity. However, the use of a rubber mandrel has some significant disadvantages for use in downhole applications.

One of the above mentioned disadvantages is that rubber typically has a high thermal expansion coefficient. As a result, when heating from ambient to a typical downhole temperature, the rubber expands by a sufficient amount to apply a large strain to the fibre, adversely affecting its reliability or possibly even breaking the fibre altogether. In addition, the long-term reliability of a rubber-based mechanism at high temperatures is uncertain. Finally, the coupling ratio of a rubber mandrel, defined as the ratio between the axial compression and the radial expansion of a rubber mandrel, is set by the geometry of the rubber cylinder and cannot be changed without changing the cylinder, and cannot be adjusted, thus limiting the versatility of the sensor.

According to a further known arrangement, disclosed in documents U.S. Pat. Nos. 5,317,929, 5,903,349 and 6,563,967, a fibre-optic force or displacement sensor relies on a planar spiral coil of fibre resting on the surface of a solid disc. Displacement, force or acceleration cause the disc to deform, resulting in a measurable change in length of the fibre. Such sensors are highly robust but offer limited sensitivity due to the relatively low coupling ratio between applied displacement and change in fibre length. As a result they are not suitable for use in high-sensitivity geophones.

A further known arrangement, disclosed in document U.S. Pat. No. 6,955,085, comprises a flexure mechanism used to stretch a fibre in response to a force or displacement applied to the same. However, this technique is only able to stretch a short, straight length of fibre, rather than a long length wound into multiple coils. As a result its sensitivity is low compared to a mandrel-based design, limiting its usefulness for geophones.

The present invention is aimed at overcoming all the drawbacks and limitations above mentioned in relation to the known prior art arrangements for fibre-optic transducers. In particular, it is an aim of the invention to provide a transducer structure for converting deformation along an axis into deformation on a plane orthogonal thereto.

It is a further aim of the present invention that the transducer structure be suitable to support a given number of loops of an optical fibre for sensing a deformation along the above mentioned axis.

It is a further aim of the present invention that the transducer structure has lower temperature sensitivity and improved reliability compared to that of known rubber mandrels, while retaining the advantageous features of deformable mandrels known in the prior art, in particular reaching high sensitivity when multiple loops of fibre are coupled with the transducer, minimum excess volume compared to that occupied by the fibre loops, robustness, and relative insensitivity to shearing motions.

It is a further aim of the present invention that the transducer structure allows the axial-compression-to-radial-expansion coupling ratio to be finely tuned.

It is a further aim of the present invention to provide a transducer whose dimensions and transducing performances are comparable to those of known transducers based on rubber mandrels.

The above aims are reached by a transducer structure according to claim 1.

The above mentioned aims are also reached by a transducer comprising the above transducer structure, according to claim 20.

The above mentioned aims are also reached by a vibration sensor comprising the above transducer, according to claim 28.

Further variant embodiments of the present invention are specified in the dependent claims.

Advantageously, the transducer structure of the invention is applicable to any situation in which a compact, high-sensitivity fibre-optic sensor for measuring applied force or displacement is required.

Still advantageously, the transducer structure of the present invention is suitable for any application where it is beneficial to convert a small deformation along one axis into a corresponding radial deformation about that axis, or vice-versa. For example, the transducer structure may be used to stretch a piezoelectric device, PVFD (polyvinylidene fluoride) film or resistive strain gauge placed around it according to an axis in response to linear displacement along that axis.

Still advantageously, the transducer structure of the present invention may be used to convert a radial deformation into an axial force or displacement acting on a linear optical fibre or other linear displacement or force sensor.

More advantageously, the transducer structure of the present invention is particularly suitable to be used in fibre-optic sensors for using in geophones.

SUMMARY OF THE INVENTION

According to a first aspect, the invention concerns a transducer structure comprising a supporting body deformable along a longitudinal axis and in which one or more flexures or hinges act as a mechanism to convert the above mentioned deformation into a corresponding radial deformation substantially perpendicular to the longitudinal axis. The supporting body comprises two end surfaces lying perpendicular to the longitudinal axis and separated along this axis, and a lateral support surface arranged around the longitudinal axis. The hinge or flexure mechanism connects the end surfaces to the lateral support surface in order to change the circumference of the lateral support surface in response to a change in the distance between the end surfaces, or vice-versa.

According to a further aspect of the invention, the supporting body comprises a plurality of lateral columns, each substantially aligned with the aforementioned longitudinal axis, a mechanism being provided to couple each lateral column at its opposite ends to a top disc and a bottom disc respectively, the discs being rigid and substantially perpendicular to the longitudinal axis and forming the end surfaces of the transducer, and whereby the surfaces of the lateral columns facing away from the longitudinal axis form the lateral surface of the transducer. The mechanism acts as a mechanical lever to convert the relative motion of the discs according to the longitudinal axis, i.e., the axial deformation of the transducer, into a relative motion of the lateral columns perpendicular to the longitudinal axis, i.e., the radial deformation of the transducer.

In a variant of the present invention the lateral columns and their respective mechanisms are formed from a single component, a portion of which is designed to move or deform so as to act as described above.

In a variant of the present invention, the above mechanisms take the form of elastically deformable flexures.

According to another aspect, the present invention concerns a transducer comprising the aforementioned transducer structure, together with elastic means to bias the end surfaces and the lateral support surface towards a predefined rest configuration.

According to another aspect, the transducer comprises an optical fibre wound in one or more loops on the lateral surface of the supporting body.

In a further aspect of the present invention, the ends of the optical fibre are constrained to the supporting body so as to prevent slipping. As a result, any radial expansion of the transducer necessarily results in a strain to the fibre, the total change in length in the fibre being the strain in each loop multiplied by the length of each loop and then multiplied by the number of loops.

The transducer can be constructed out of any suitable material. A metal construction is preferred due to the high reliability and low expansion coefficient of common metals. A particularly preferred metal is steel.

In a variant embodiment of the present invention, the top end of the transducer structure is an additional disc connected to the top disc of the supporting body through a mechanism arranged to have high compressive stiffness but low shear stiffness. This allows the transducer as a whole to act on compressive motions while being relatively unaffected by shearing motions. Preferably, the above mechanism takes the form of a thin rod.

In a variant of the present invention, multiple parallel thin rods can be used in place of a single rod. Such a configuration is advantageous where it is desirable to increase the torsional stiffness of the transducer while maintaining high compressive stiffness and low shear stiffness.

In a further variant embodiment of the present invention, a different material can be used for the sensing element instead of the aforementioned optical fibre. Examples include, but are not limited to, a resistive strain gauge, a PVDF (polyvinylidene fluoride) film or piezo-electric material.

In a yet further variant embodiment of the present invention, the sense of operation of the transducer is reversed to convert radial force or displacement into axial force or displacement. For example, the transducer can be configured to linearly stretch an optical fibre running along the longitudinal axis and secured to the top and bottom discs in response to radial compression. Such a configuration may be useful, e.g., to measure the change in diameter of a transducer structure with a diameter which is too small to allow an optical fibre to be wound around, or to measure the radial force acting on said transducer structure.

In a further variant embodiment of the present invention, the transducer structure is used as an actuator rather than a sensor. Either a radial force generator, for example a piezo-electric cylinder, can be arranged to exert a force directed to mutually approach or move away the lateral columns which is converted into a force acting on the discs according to the longitudinal axis, or a linear force generator, such as a solenoid actuator or linear piezo-electric actuator, is arranged to connect the two discs to generate an axial force which is converted into a radial force.

BRIEF DESCRIPTION OF DRAWINGS

The invention is disclosed with non-limiting reference to the attached drawings, as follows:

FIG. 1 shows schematically a transducer based on rubber mandrels according to the prior art;

FIG. 2 shows an axonometric view of a transducer comprising the transducer structure of the present invention;

DETAILED DESCRIPTION OF SOME PREFERRED EMBODIMENTS OF THE INVENTION

Figure 3:
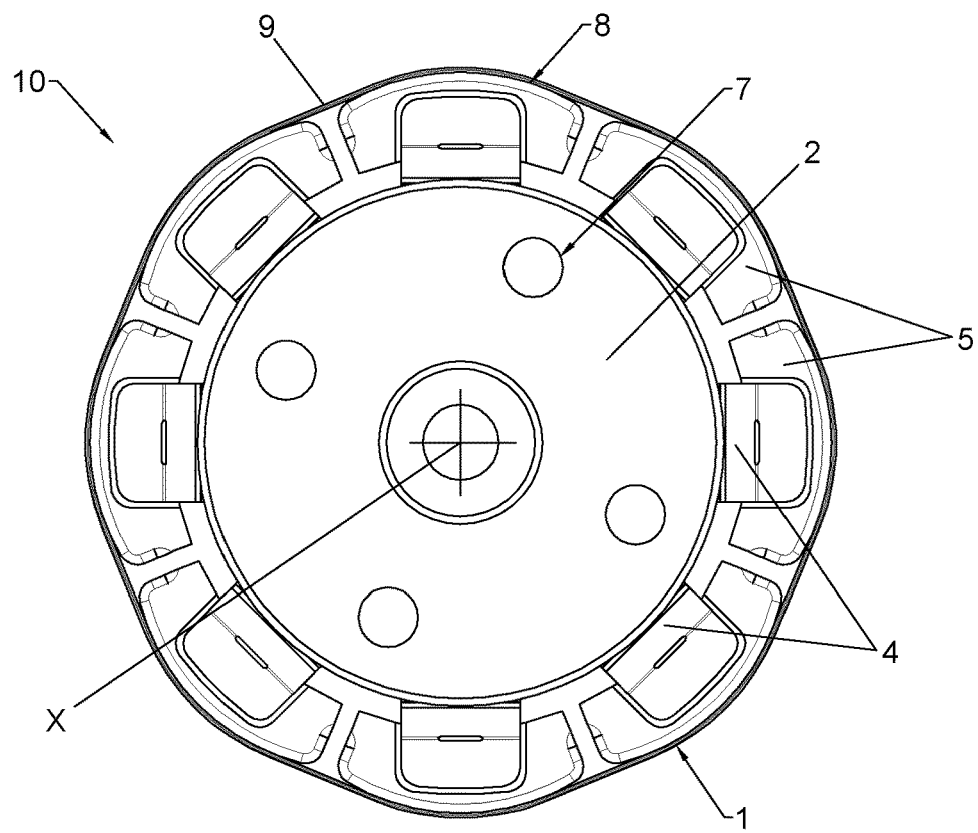
FIG. 3 shows a plan view of the transducer of FIG. 2.

It is hereby noticed that, for the sake of clarity, when the drawings depict a number of elements that clearly have the same function, the reference number is reported only for one of those elements, being it understood that the same reference number applies to all the other of those elements.

FIG. 2 shows a transducer 10 according to the present invention, comprising a transducer structure 1 adapted to convert a deformation along a reference axis X into a radial deformation orthogonal to that reference axis X.

In this preferred embodiment, the reference axis X is the axis along which it is desired to measure force or displacement.

The transducer structure 1 comprises two end plates 2, 3, preferably disc-shaped, which are arranged along the reference axis X and mutually facing. Preferably, the centers of mass of both end plates 2, 3 are aligned with the reference axis X.

The transducer structure 1 also comprises a plurality of lateral bars 5, arranged around the reference axis X so that their lateral surfaces 8 facing away from the reference axis X, taken in their whole, define a support surface developed around the reference axis X.

Preferably, the lateral bars 5 are so connected that they are allowed to move with respect to each other on a plane orthogonal to the reference axis X. The effect just mentioned can be achieved by separating the lateral bars 5 on said plane, as it is the case with the embodiments depicted in the drawings, where the lateral bars 5 are connected to each other only at their ends but not along their longitudinal edges, as it will be explained later.

According to a different embodiment, not shown in the drawings, the lateral bars 5 can be mutually connected along their longitudinal edges through deformable elements that allow the relative movement thereof.

Preferably, each lateral bar 5 is arranged parallel to the reference axis X, in a substantially circular pattern.

Each lateral bar 5 has each of its opposite ends respectively connected to the two end plates 2, 3 through two respective connection members 4.

Figure 8:
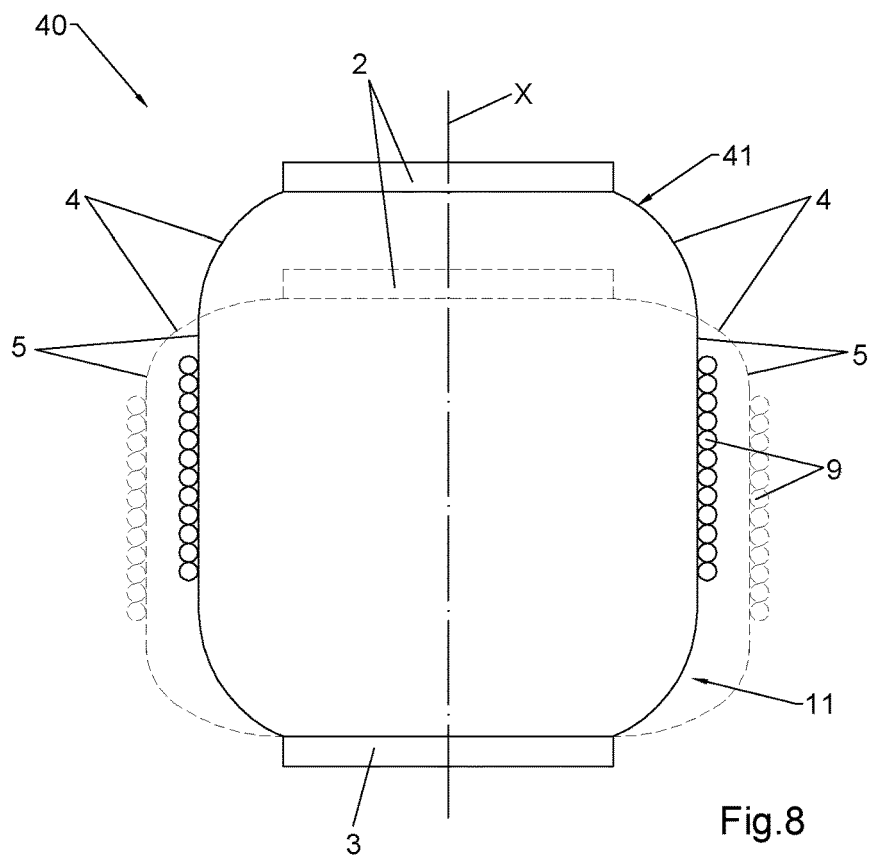
FIG. 8 shows the transducer according to a variant embodiment of the present invention, in which the lateral bars and hinges are integrally formed.

FIG. 8 shows a cross-section of a variant of the transducer in which the connection members 4 and the lateral bars 5 are formed from a single element shaped so that a deformation along axis X causes a corresponding deformation perpendicular to axis X.

As better seen in FIG. 3, the connection members 4 project radially from each end plate 2, 3 according to respective mutually different directions.

The connection members 4 act as levers to convert a mutual approach between the end plates 2, 3 according to the reference axis X, i.e., an axial deformation of the transducer structure 1, into a corresponding movement of the lateral bars 5 away from the reference axis X, i.e., a radial deformation of the transducer structure 1, and vice-versa.

To obtain the result just mentioned, the connection members 4 are deformable on respective deformation planes passing through the reference axis X. The connection members 4 can be made deformable by equipping them with elastically deformable portions, and/or with hinge portions connecting adjacent parts of the connection members 4 in order to allow the mutual movement of said adjacent parts.

As it will be better explained hereinafter, in the embodiments depicted in FIGS. 2-7 the connection members 4 comprise hinges 4a, wherein in the embodiment depicted in FIG. 8 the connection members 4 comprise elastically deformable parts.

Evidently, the transducer structure 1 above described is functionally equivalent to a rubber mandrel of known kind. In particular, if a sensing element 9 is wound around the support surface defined by the lateral surfaces 8 of the lateral bars 5, it is possible to detect any change in the distance between the end plates 2, 3 by sensing the change in length of the sensing element 9.

Figure 6:
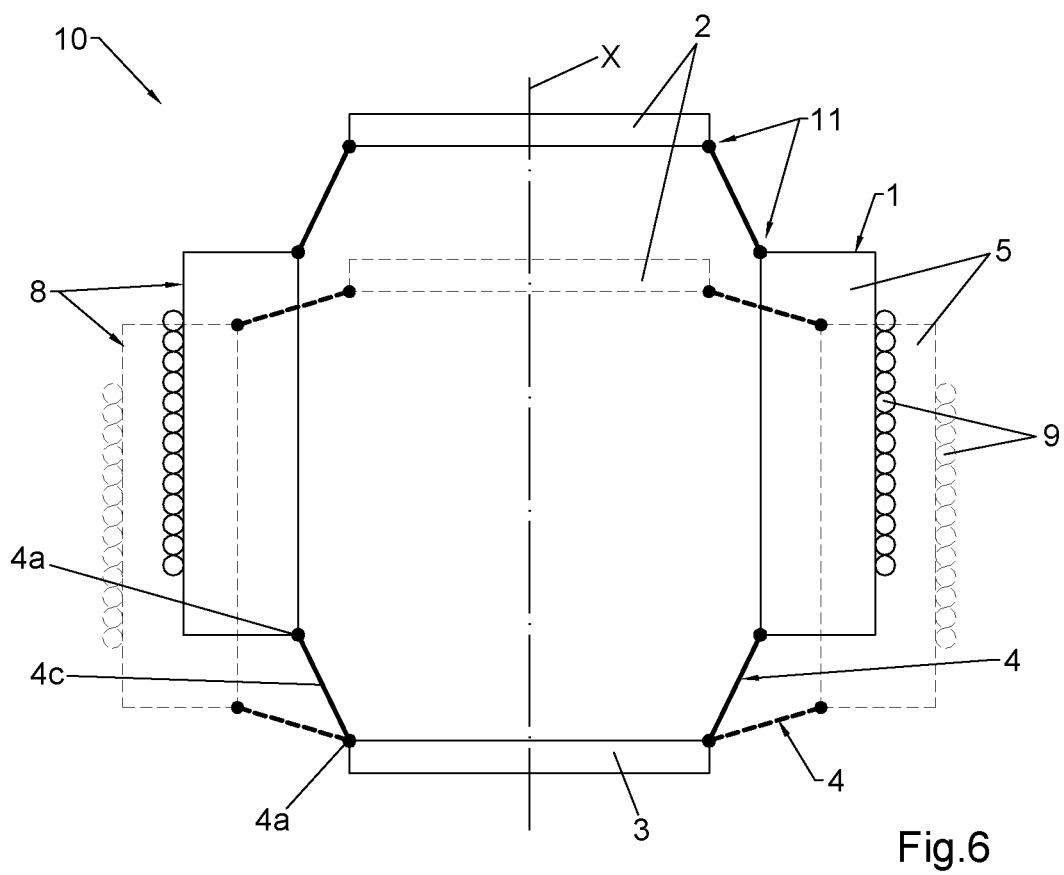
FIG. 6 shows a simplified lateral cross-sectional view of the transducer illustrating the way it operates.

In fact, a reduction of the distance between the end plates 2, 3 causes a corresponding increase in the effective diameter of the support surface which in turns stretches the sensing element 9. This event is schematically shown in FIG. 6, where the transducer 10 is depicted in two different configurations, namely a rest configuration in continuous lines and an axially compressed configuration in dotted lines.

The transducer structure 1 can be made in any material having suitable mechanical properties, in particular having a lower thermal expansion coefficient than rubber. This allows to reach one of the aims of the present invention, namely to obtain a transducer structure 1 with lower temperature sensitivity and improved reliability compared to that of known rubber mandrels, while retaining the advantageous features of rubber mandrels known in the prior art.

In the above respect, the transducer structure 1 can be constructed out of any suitable material, but a metal construction, e.g., steel, appears to be particularly advantageous.

Moreover, the materials used for the transducer structure 1 have preferably such stiffness that the deformation of the transducer structure 1 in normal operation substantially occurs at the level of the connection members 4, while being substantially absent in the other elements of the transducer structure 1.

Preferably, each connection member 4 is connected to the corresponding end plate 2, 3 and to the corresponding lateral bar 5 by means of two respective hinge elements 11, so that the conversion of a mutual movement of the end plates 2, 3 along the reference axis X in a mutual movement of the lateral bars 5 perpendicular to the reference axis X occurs through a rotation of part of the connection members 4 with respect to the end plates 2, 3 and the lateral bars 5, while the length of the connection members 4 remains unaltered. The hinge elements 11 may be formed from mechanical bearings as in a conventional hinge, or they may consist of deformable hinge portions 4a within the connection members 4, as depicted in FIG. 5.

Figure 5:
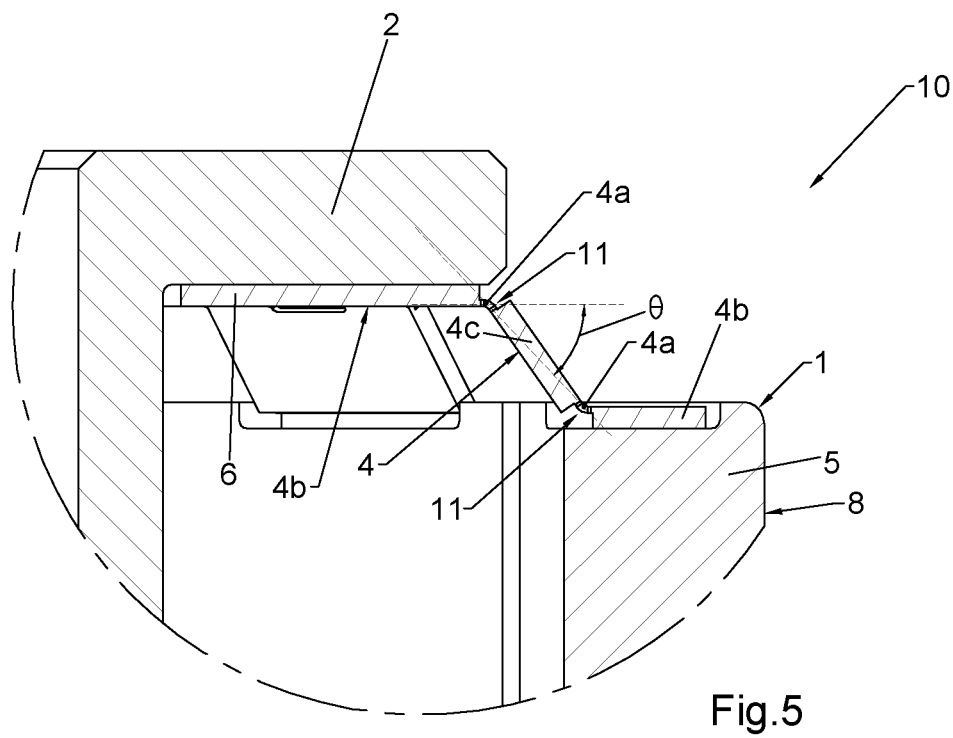
FIG. 5 shows a detailed view of FIG. 4.

Preferably, and as can be seen in FIG. 5, a second portion 4c of the connection member 4 comprised between the two hinge elements 11 is inclined, with respect to the reference axis X, by an angle θ. The angle θ is governed by the positions of the two hinge elements 11 and should be adjusted so as to maximize the overall coupling ratio of the transducer structure 1. For most applications, an optimal coupling ratio can be obtained with the angle θ being between 40° and 50°.

For a typical transducer structure having a diameter of 20 mm, coefficient of elasticity of 1N/μm along the reference axis X and a sensing element comprising 50 turns of 50 μm silica optical fibre, the optimum value of θ can be shown to be comprised between 40° and 50°, and preferably close to 45°.

Each connection member 4 can be formed out of discrete components with the hinge elements 11 between them.

Nevertheless, the connection member 4 is preferably a single piece of material and comprises two first portions 4b for connecting to the end plates 2, 3 and to the lateral bars 5. The connection member 4 also comprises a second portion 4c arranged between the above first portions 4b and connected with them through respective hinge portions 4a corresponding to the above indicated hinge elements 11.

In particular, the hinge portions 4a have a lower stiffness on the deformation plane compared to the portions 4b and 4c, in order to allow the connection member 4 to readily bend at said hinge portions 4a. Advantageously, such a connection member 4 in a single piece allows for simplified manufacturing process and improved reliability of the transducer structure 1.

Preferably, the hinge portions 4a are kept as short as possible to prevent buckling of the material in these regions, while the second portion 4c is designed to be sufficiently stiff to prevent buckling or other deformations under applied loads.

Preferably, the single body is in the form of a laminar body, which can be obtained by cutting a laminar sheet or by any other suitable process. In this embodiment, the lower elasticity coefficient of the hinge portions 4a can be easily obtained by conferring to these portions a reduced cross section compared to the cross section of the second portion 4c, for example through a reduced thickness of the hinge portions 4a and/or through perforating or cutting notches into the laminar body at the hinge locations.

The choice of the thickness of the second portion 4c and the reduced thickness of the hinge portions 4a is governed by the maximum load that can be provided to be applied to the connection members 4. Both thicknesses must be sufficient to prevent buckling or plastic deformation under load. However, excess thickness at the hinge portions 4a increases the inherent stiffness of the transducer structure 1, thus decreasing its overall coupling ratio and reducing its performance.

The width of the connection members 4 is governed by similar considerations, with the additional complication that the shear-stiffness of the transducer structure 1 increases with increasing width of the connection members 4.

For example, in a transducer structure 1 subjected to a maximum load of 20N, spread across eight steel lateral bars 5, and with an angle θ of inclination of the second portion 4c with respect to the reference axis X equal to 45°, a thickness of 250 μm for the second portion 4c reducing to 75 μm in the hinge portions 4a and a width of 3.2 mm provide a safety factor of approximately 2:1 against buckling or plastic deformation.

Possible manufacturing techniques for the above laminar connection member 4 include, but are not limited to, chemical etching and electro-deposition.

Preferably, the connection member 4 is made from a spring steel, which is plastically deformed into the required shape and is then heat treated to achieve high strength and stiffness.

Preferably, all connection members 4 associated to each end plate 2 or 3 belong to a single laminar body, which is provided with an annular element 6, shown in FIG. 5, from which the connection members 4 project. The annular element 6 can be used for fixing the laminar body to the end plate 2, 3.

Concerning the lateral bars 5, their number is a compromise between manufacturing complexity and efficiency. Reducing the number of bars simplifies the assembly process, but the smaller that number, the less circular the support surface on which the sensing element 9 is wound. Since the total efficiency of the transducer 10 depends on the total length of the sensing element around the transducer, and since this length is maximized by a circle, which would require an infinite number of bars, any finite number of bars will have reduced efficiency. In practice, a configuration of eight lateral bars has been found to give a good compromise, leading with an efficiency loss of only around 2% compared to the theoretical circular case.

Preferably, the lateral bars 5 are designed to provide efficient coupling into the transducer structure 1 while not unduly stressing the sensing element 9. A wider lateral bar will result in a less concentrated stress on the sensing element. However, for an efficient transducer 10, the sensing element should be free to slide over the lateral bars 5 so that the entire circumference of the sensing element is strained, not just the portions between bars. If the lateral bars are too wide, the resulting increase in capstan friction limits the efficiency of the transducer 10. For a typical diameter of around 20 mm of the support surface, a width of around 6 mm for the lateral bars 5 offers a good compromise.

Preferably, the lateral surfaces 8 of the lateral bars 5 have a convex profile on a plane perpendicular to the reference axis X, so as to foster the effects above explained.

Still preferably, the above convex profile has a circular shape and its radius is smaller compared to the radius of the cylinder tangent to the lateral surface 8 of each lateral bar 5 when the transducer 10 is in a rest configuration in absence of external forces.

Advantageously, this ensures that the lateral surface 8 of each lateral bar 5 curves away from the sensing element 9 at the point where this passes to an adjacent bar. This is beneficial since it avoids the risk that sharp edges in the lateral bars 5, which may be present due to manufacturing limitations, might damage the sensing element 9.

Concerning the sensing element 9, this is preferably an optical fibre, but in different embodiments of the present invention it could be a resistive strain gauge, an electric fibre and/or a piezoelectric element, e.g., a PVDF (polyvinylidene fluoride) film.

The optical fibre is wound in a plurality of substantially horizontal loops around the support surface defined by the lateral surfaces 8 of the lateral bars 5, so that each loop lies on a plane substantially perpendicular to the reference axis X.

Figure 4:
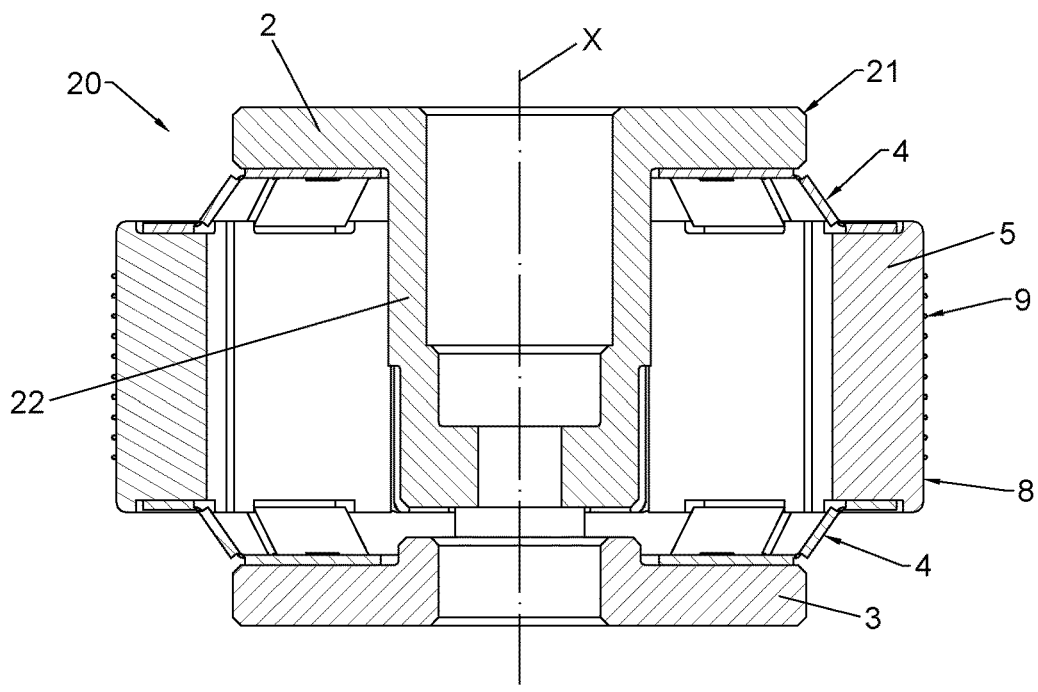
FIG. 4 shows a lateral cross-sectional view of the transducer of FIG. 2.

According to a variant embodiment of the transducer structure of the present invention, shown in FIG. 4 and hereby indicated with number 21, a spacer body 22 is provided, interposed between the end plates 2, 3 in order to limit the amount of the approaching movement between the two end plates 2, 3 with respect to the rest configuration in absence of external forces.

Advantageously, the above mentioned spacer body 22 acts as an over-travel stop to limit the compression of the transducer structure 21 in response to forces which would otherwise damage the connection members 4 or the sensing element 9.

Preferably, the above mentioned spacer body 22 projects from the end plate 2 and extends to the opposite end plate 3, leaving only a small gap.

Sometimes it is desirable to have a transducer structure which allows to achieve much lower stiffness in shear than in compression.

This is readily achieved by the rubber mandrels known in the art since a shearing motion results in no net stretch of the fibre as the coils are free to slide past each other. However, the situation is more complex with the transducer structure of the present invention. In principle, low shear stiffness can be achieved by reducing the width of the connection members 4 at the hinge portions 4a. However, this reduces the maximum load which can be transmitted by the connection members 4 without plastic deformation.

Figure 7:
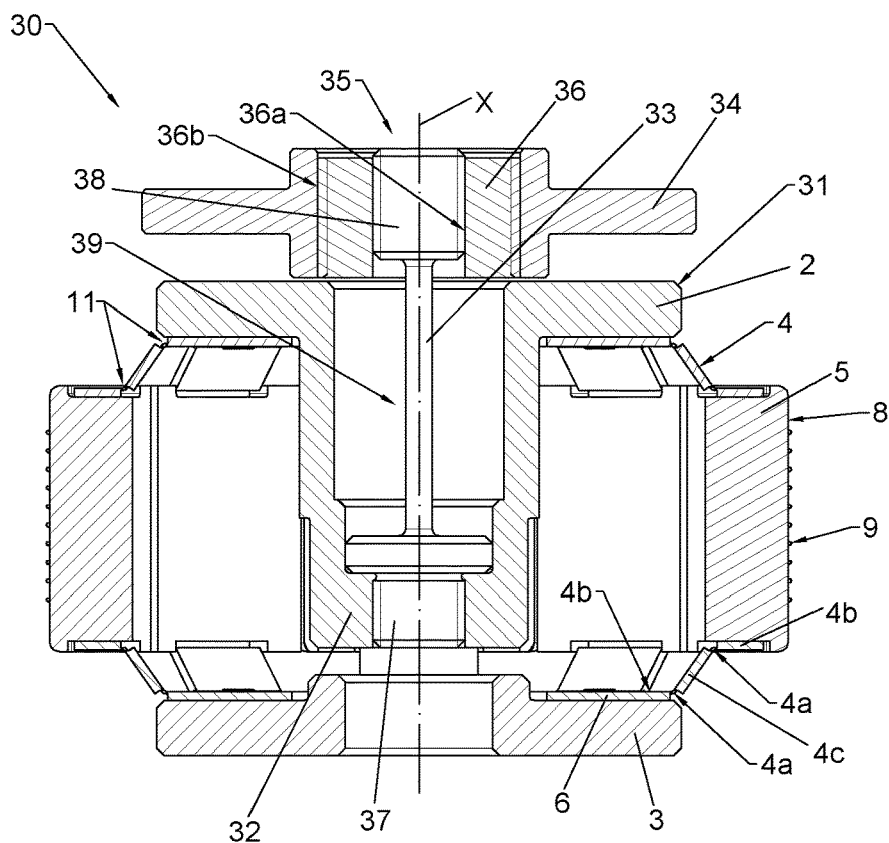
FIG. 7 shows a transducer structure comprising a transducer structure according to a variant embodiment of the present invention, particularly suited for use in situations where lower shear stiffness and/or pre-load adjustment are required.

The above mentioned reduction in maximum load is avoided by a transducer structure 31 and a corresponding transducer 30, according to an embodiment of the present invention, as shown in FIG. 7. Components of the above mentioned transducer structure 31 that are functionally equivalent to components of the previous embodiments are indicated in FIG. 7 with the same reference numbers.

The transducer structure 31 comprises two end plates 2, 3, lateral bars 5 and connection members 4 having the same functions of the corresponding components of the embodiments discussed above.

In addition to that, the transducer structure 31 comprises a shear decoupling unit 39 having a smaller stiffness under a deformation orthogonal to the reference axis X than under a deformation parallel to the reference axis X.

Preferably, the shear decoupling unit 39 comprises a decoupling rod 33 having one end firmly connected to a first end plate 2 preferably through a threaded collar 37, welded or otherwise bonded to the decoupling rod 33, which is then screwed on the first end plate 2.

An additional end plate 34 is also provided, facing the first end plate 2 and being firmly connected to the opposite end of the decoupling rod 33 through connection means 35.

The additional end plate 34 acts as the upper support surface of the transducer structure 31 in place of the first end plate 2.

The shear decoupling unit 39 allows relative movements between the additional end plate 34 and the first end plate 2 in a direction orthogonal to the reference axis X, while preventing relative movements between the same elements in a direction parallel to the reference axis X.

By choosing the dimensions of the decoupling rod 33 appropriately, this can retain sufficient stiffness to have negligible effect on the performance of the transducer structure 31 in compression, yet still be sufficiently weak in shear to lower the transducer structure's overall shear stiffness to be a small fraction of its compressive stiffness. For example, in a transducer structure having a 2N/μm stiffness without the decoupling rod, a 10 mm long, 1.1 mm diameter steel decoupling rod reduces the compression stiffness of the transducer structure by less than 10%, while reducing its shear stiffness to less than 10% of its axial stiffness.

Preferably, the first end plate 2 has a central area 32 which is lowered towards the second end plate 3, so as to create a central channel in which most part of the decoupling rod 33 is arranged. This allows the axial dimension of the transducer structure 31 to be minimised.

In a variant embodiment of the present invention, not shown in the figures, the shear decoupling unit 39 may comprise a plurality of mutually parallel thin rods instead of a single decoupling rod of the above mentioned type. Such a configuration has the advantage to increase the torsional stiffness of the transducer structure compared to than achievable with a single rod, while still maintaining a low shear stiffness.

According to a further variant embodiment of the present invention, not shown in the figures, the shear decoupling unit 39 may comprise a plurality of thin rectangular flexures arranged in two groups. The flexures in the first group are all of substantially the same size and lie parallel to each other and perpendicular to the first end plate 2. Each flexure in the first group has one edge rigidly mounted onto the first end plate 2 and the opposite edge rigidly mounted to an intermediate spacer plate lying parallel to the first end plate 2. The flexures in the second group are arranged above the flexures of the first group and are all of the same size, parallel to each other and perpendicular to the first end plate, but also perpendicular to the first group of flexures. Each flexure in the second group has one edge rigidly mounted to the intermediate spacer plate and the opposite edge mounted to the additional end plate 34, optionally via connection means similar as those described above. Advantageously, the arrangement just mentioned allows to obtain a transducer structure having higher torsional stiffness compared to the previously mentioned embodiments.

Preferably, the connection means 35 between the decoupling rod 33 and the additional end plate 34 are operable to adjust the distance between the first end plate 2 and the additional end plate 34. The above mentioned adjustment allows to modify the amount of compression that is applied to the transducer structure 31 when it is inserted into a predetermined space, e.g., the space between the shell of a vibration sensor and a proof mass arranged inside thereof. This allows the pre-load force on the transducer structure 31 to be precisely adjusted to ensure that the sensing element 9 is in good contact with all the lateral bars 5 even when no axial load is applied to the transducer structure.

In order to allow the above mentioned adjustment, the connection means 35 preferably comprise a tubular body 36 interposed between the first end plate 2 and the additional end plate 34. The tubular body 36 comprises an inner thread 36*a* and an outer thread 36*b* having the same direction and slightly different pitches. The threads 36*a*, 36*b* are conjugated with, respectively, an outer thread attached to the decoupling rod 33 and an inner thread attached to the additional end plate 34. Preferably, the outer thread attached to the decoupling rod 33 belongs to a second threaded collar 38 welded or otherwise bonded to the decoupling rod 33.

As a result of the above mentioned two threads 36*a*, 36*b*, rotating the tubular body 36 when the additional end plate 34 and the second end plate 3 are rotatably fixed causes the decoupling rod 33 to move axially with an effective pitch equal to the difference in the pitch of the two threads.

For example, if an M2.5×0.45 for the inner thread and an M5.5×0.5 for the outer thread are used, one full rotation of the tubular body 36 results in an axial displacement of the additional end plate 34 of 50 μm with respect to the decoupling rod 33. With a 2N/μm transducer structure stiffness, the pre-load can be varied by 0.3N/degrees of rotation of the tubular body 36. Typically, a pre-load of 12±2N is applied, corresponding to a rotation of 43±7° degrees. Advantageously, this is readily achievable by hand adjustment.

According to a different aspect, the present invention concerns a transducer comprising a transducer structure according to the above disclosure, to which a sensing element 9 is coupled so that a deformation of the transducer structure causes a corresponding deformation of the sensing element 9.

Preferred embodiments are the transducers 10, 20, 30 described above, and respectively comprising the transducer structures 1, 21, 31.

Preferably, the sensing element 9 is arranged so as to connect two or more of the lateral bars 5 of the transducer structure, so that a compressive force acting to push the two end plates 2, 3 one towards another according to the reference axis X of the transducer structure causes a deformation of the sensing element 9 on a plane orthogonal to the reference axis X.

Still preferably, the sensing element 9 is wound around, and outside, the lateral bars 5 so that a movement of the lateral bars 5 away from each other causes the sensing element 9 to be stretched.

Still preferably, the sensing element 9 is a thread-like or band-like elongated body wound in a plurality of loops around the lateral bars 5.

Still preferably, the above thread-like or band-like elongated body has its two opposite ends fixed to the lateral bars 5. This could be achieved by mechanical clamping, gluing, soldering to a metalized coating on the elongated body, or by using glass-to-metal seals to hold the elongated body into a metal tube attached to the transducer structure. For high-temperature applications the use of a high-temperature, low-creep solder is preferred. Whatever attachment process is used, care should be taken so that only the first and final turns of the elongated body are restrained. Any restraint intermediate turn in addition to the first one and final one will reduce the total length of the elongated body which can be stretched by the transducer structure, thus reducing its efficiency.

As discussed above, the elongated body preferably comprises an optical fibre. The fibre should be chosen to have the smallest diameter possible for maximum sensitivity, since this both reduces the fibre's cross-sectional area and increases the number of turns which can be packed into a given height.

Preferably, the transducer structure 1, 21, 31 is preloaded so that, in a rest configuration in absence of external forces, the sensing element 9 is tensioned. The preload may be achieved through the adjustable connection means 35 above mentioned, or through any other suitable system.

In all embodiments described above, elastic means are provided to bias the end plates 2, 3 and the lateral bars 5 towards the above mentioned rest configuration.

Preferably, the above mentioned elastic means comprise one or more connection members 4, wherein each of these is partly or fully elastically deformable within the corresponding deformation plane. For example, referring to the embodiment of FIG. 5, the elasticity of the connection members 4 is located at their hinge portions 4*a*. On the contrary, in the embodiment of FIG. 8, it is the whole connection member 4 which is elastically deformable.

According to a further embodiment, the elastic means comprise the sensing element 9, which is elastically deformable so as to bias the end plates 2, 3 and the lateral bars 5 towards the rest configuration.

According to a different embodiment of the present invention, not shown in the attached drawings, the sensing element 9 may be arranged so as to connect the two end plates 2, 3 of the transducer structure 1, 21, 31. Preferably, the sensing element 9 is fixed to the two end plates 2, 3 at opposite ends thereof, so that a movement of the end plates 2, 3 away from each other causes the sensing element 9 to be stretched. In this case, the sensing element 9 is used to sense a compressive force acting radially to push the lateral bars 5 towards the reference axis X.

According to a different aspect, the present invention concerns a vibration sensor, not shown in the drawings, comprising a support structure, e.g., a containment shell and a proof mass suspended to said support structure by means of one or more transducers according to the present invention, e.g., the transducers 10, 20, 30 above disclosed, that are interposed between the support structure and the proof mass.

A movement of the proof mass with respect to the support structure results in a force applied on the transducers whose reference axes are not orthogonal to the direction of movement. The resulting force can then be sensed by the respective sensing elements.

Evidently, the above sensor can be configured as a geophone, i.e., as a sensor for sensing seismic vibrations.

Preferably, the sensor comprises several transducers whose reference axes are oriented according to mutually different directions, in order to be able to detect the movements of the proof mass in all three spatial directions.

Preferably, each transducer 10, 20, 30 is connected to the support structure through one or more threaded elements 7, e.g., threaded holes, belonging to one or both end plates 2, 3 and/or to the additional end plate 34.

According to a different aspect, the present invention concerns an actuating transducer adapted to convert an electric signal into a force.

The above actuating transducer, not shown in the drawings, comprises a transducer structure according to the present invention, e.g., one of the transducer structures 1, 21, 31 above disclosed, and an actuator operable to force a relative movement between the lateral bars 5 according to a direction perpendicular to the reference axis X, or a relative movement between the end plates 2, 3 according to a direction parallel to the reference axis X.

The transducer structure 1, 21, 31 converts the force exerted by the actuator in a corresponding movement perpendicular to the direction of the force.

Preferably, the actuator comprises a piezoelectric actuator and/or a solenoid actuator.

From the above description, it is clear that the present invention reaches all the set objects.

In particular, the transducer structure according to the present invention is capable of converting deformation along an axis into deformation on a plane orthogonal thereto.

Moreover, the lateral bars of the transducer structure define a surface suitable to support a number of loops of an optical fibre for sensing a deformation along the above mentioned axis.

Additionally, the transducer structure is adapted to be constructed using materials with lower temperature sensitivity compared to that of known rubber mandrels, thus offering improved reliability.

At the same time, the transducer structure is functionally similar to the known rubber mandrels, and as such retains the same advantages of the latter, in particular to reach high sensitivity when multiple loops of fibre are coupled with the transducer, minimum excess volume compared to that occupied by the fibre loops, robustness, and relative insensitivity to shearing motions.

Moreover, the connection means for adjusting the distance between the first end plate and the additional end plate allow the axial-compression-to-radial-expansion coupling ratio to be finely tuned.

Where technical features mentioned in any claim are followed by reference signs, those reference signs have been included for the sole purpose of increasing the intelligibility of the claims and accordingly such reference signs do not have any limiting effect on the protection of each element identified by way of example by such reference signs.

The invention claimed is:

1. A transducer structure for converting a deformation along an axis into a corresponding deformation on a plane orthogonal to said axis, comprising:
    two end plates facing each other and aligned along a common reference axis (X);
    a plurality of connection members projecting radially from each end plate according to respective mutually different directions;
    a plurality of lateral bars, each lateral bar connecting said end plates to one another through two respective of said connection members;
    wherein said connection members are deformable within respective deformation planes to allow relative movements between said end plates and said lateral bars to convert an axial movement of mutual approach between said two end plates into a corresponding radial movement of said lateral bars away from said reference axis (X), and vice-versa;
    further comprising an additional end plate facing a first one of said end plates and connected to said first end plate through a shear decoupling unit having a smaller stiffness under a deformation orthogonal to said reference axis (X) than under a deformation parallel to said reference axis (X) to allow relative movements between said additional end plate and said first end plate in a direction orthogonal to said reference axis (X) while preventing said relative movements in a direction parallel to said reference axis (X).

2. The transducer structure according to claim 1, wherein each connection member comprises one or two hinge elements, each hinge element being configured to allow mutual rotation between two mutually adjacent parts within said connection member according to a corresponding hinge axis orthogonal to the respective deformation plane.

3. The transducer structure according to claim 2, wherein said connection member comprises a laminar body, wherein at least one of said hinge elements is a hinge portion belonging to said laminar body and connects a first portion with a second portion both belonging to said laminar body, wherein said hinge portion has a lower stiffness under bending about the respective hinge axis than said second portion.

4. The transducer structure according to claim 3, wherein said hinge portion has a smaller thickness compared to a thickness of said second portion.

5. The transducer structure according to claim 3, wherein said hinge portion is defined by perforations or notches in said laminar body.

6. The transducer structure according to claim 3, wherein said second portion is inclined, with respect to said reference axis (X), by an angle comprised between 40° and 50°.

7. The transducer structure according to claim 1, wherein each lateral bar and the connection members of each lateral bar are integrally formed.

8. The transducer structure according to claim 1, wherein all connection members associated to one of said end plates are rigidly connected to a corresponding annular element which is fixed to said end plate.

9. The transducer structure according to claim 1, wherein each one of said lateral bars comprises a lateral surface facing opposite to said reference axis (X), said lateral surface having a convex profile on a plane perpendicular to said reference axis (X).

10. The transducer structure according to claim 9, wherein said convex profile has a circular shape and a radius of the convex profile is smaller than a radius of a cylinder tangent to said lateral surface of each of said lateral bars at least when said transducer structure is in a first operating configuration.

11. The transducer structure according to claim 1, further comprising a spacer body interposed between said two end plates and configured to limit an amount of the approaching movement between said two end plates.

12. The transducer structure according to claim 1, wherein said shear decoupling unit comprises a decoupling rod having one end rigidly fastened to said first end plate and an opposite end rigidly fastened to said additional end plate through means for connecting said first end plate and said additional end plate.

13. The transducer structure according to claim 12, wherein said means for connecting said first end plate and said additional end plate is operable to adjust a distance between said first end plate and said additional end plate.

14. The transducer structure according to claim 13, wherein said means for connecting said first end plate and said additional end plate comprises a tubular body interposed between said first end plate and said additional end plate, said tubular body comprising an inner thread and an outer thread having the same direction and slightly different pitches, said inner and outer threads being conjugated with, respectively, an outer thread attached to said decoupling rod and an inner thread attached to said additional end plate.

15. The transducer structure according to claim 1, further comprising means for biasing said end plates and said lateral bars towards a predefined rest configuration.

16. The transducer structure according to claim 15, wherein said means for biasing comprises one or more connection members, wherein each one of said one or more connection members is elastically deformable within the corresponding deformation plane.

17. The transducer structure according to claim 1, further comprising an actuator operable to force a relative movement between said lateral bars according to a direction perpendicular to said reference axis (X), or between said end plates according to a direction parallel to said reference axis (X).

18. The transducer structure according to claim 17, wherein said actuator comprises a piezoelectric actuator and/or a solenoid actuator.

19. A transducer comprising said transducer structure and a sensing element connected to said transducer structure so that a deformation of said transducer structure causes a corresponding deformation of said sensing element, wherein said transducer structure is according to claim 1, said sensing element being arranged so as to connect at least two lateral bars of said transducer structure, or said two end plates of said transducer structure, in such a way that a relative movement between said at least two lateral bars or between said two end plates causes a corresponding deformation of said sensing element.

20. The transducer according to claim 19, wherein said sensing element comprises an optical fibre, a resistive strain gauge or a piezoelectric element.

21. The transducer according to claim 19, wherein said transducer structure is preloaded so that, when said transducer structure is not subjected to external forces, said transducer structure assumes a static configuration of equilibrium in which said sensing element is tensioned.

22. The transducer according to claim 19, wherein said sensing element is elastically deformable so as to bias said end plates and said lateral bars towards a predefined rest configuration.

23. The transducer according to claim 19, wherein said sensing element is arranged around, and outside, said lateral bars so that a movement of said lateral bars away from each other causes said sensing element to be stretched.

24. The transducer according to claim 23, wherein said sensing element is a thread-like or band-like elongated body wound in a plurality of loops around said lateral bars.

25. The transducer according to claim 24, wherein said elongated body has the opposite ends fixed to said lateral bars.

26. The transducer according to claim 19, wherein said sensing element is fixed to said two end plates at opposite ends thereof so that a movement of said end plates away from each other causes said sensing element to be stretched.

27. A vibration sensor comprising a support structure and a proof mass suspended to said support structure through at least one of said transducer according to claim 19.

\* \* \* \* \*